US012640278B2

(12) United States Patent
Swartz et al.

(10) Patent No.: US 12,640,278 B2
(45) Date of Patent: May 26, 2026

(54) COMPACT PASSIVE DECAY HEAT REMOVAL SYSTEM FOR TRANSPORTABLE MICRO-REACTOR APPLICATIONS

(71) Applicant: Westinghouse Electric Company LLC, Cranberry Township, PA (US)

(72) Inventors: Matthew M. Swartz, Claridge, PA (US); Anthony G. Trupiano, Pittsburgh, PA (US); Jurie J. Van Wyk, Mars, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 484 days.

(21) Appl. No.: 17/997,629

(22) PCT Filed: Apr. 19, 2021

(86) PCT No.: PCT/US2021/027950
§ 371 (c)(1),
(2) Date: Oct. 31, 2022

(87) PCT Pub. No.: WO2021/221940
PCT Pub. Date: Nov. 4, 2021

(65) Prior Publication Data

US 2023/0170101 A1 Jun. 1, 2023

Related U.S. Application Data

(60) Provisional application No. 63/018,539, filed on May 1, 2020.

(51) Int. Cl.

| | |
|---|---|
| ***G21F 5/10*** | (2006.01) |
| *G21C 15/257* | (2006.01) |
| *G21D 5/02* | (2006.01) |

(52) U.S. Cl.
CPC ............ *G21F 5/10* (2013.01); *G21C 15/257* (2013.01); *G21D 5/02* (2013.01)

(58) Field of Classification Search
CPC ................ G21F 5/00; G21F 5/10; G21D 5/02
See application file for complete search history.

(56) References Cited

U.S. PATENT DOCUMENTS 3,047,485 A * 7/1962 Ellis ........................ G21C 11/04
976/DIG. 139
3,073,961 A * 1/1963 Nachbar ................... G21F 5/10
976/DIG. 348

(Continued)

FOREIGN PATENT DOCUMENTS

CN 106205757 A * 12/2016
WO 2014159155 A1 10/2014

(Continued)

OTHER PUBLICATIONS

International Search Report and Written Opinion for International PCT Application No. PCT/US2021/027950, dated Sep. 10, 2022.

*Primary Examiner* — Sharon M Davis
(74) *Attorney, Agent, or Firm* — K&L Gates LLP

(57) ABSTRACT

A container for transporting a reactor is disclosed. The container includes a loop thermosiphon including a chamber, a heat exchanger fluidically coupled to the chamber, and an actuator including an unactuated state and an actuated state. The actuator is configured to automatically transition to the actuated state. The transition is based on an event occurring within the reactor. A working medium is configured to remove heat from the reactor in the actuated state.

23 Claims, 4 Drawing Sheets

(56) References Cited

U.S. PATENT DOCUMENTS

| | | | | | |
|---|---|---|---|---|---|
| 3,113,215 | A * | 12/1963 | Allen | G21F 5/10 | 976/DIG. 348 |
| 3,230,373 | A * | 1/1966 | Montgomery | G21F 5/10 | 250/493.1 |
| 3,378,449 | A * | 4/1968 | Croke | B64G 1/422 | 136/202 |
| 3,845,315 | A * | 10/1974 | Blum | G21F 5/012 | 976/DIG. 348 |
| 6,802,671 | B1 * | 10/2004 | Badie | F28D 15/0266 | 405/129.55 |
| 2002/0070486 | A1 * | 6/2002 | Kim | G21C 15/18 | 266/155 |
| 2012/0294737 | A1 * | 11/2012 | Singh | F28F 1/16 | 165/104.21 |
| 2015/0096721 | A1 * | 4/2015 | Mochizuki | F28D 15/06 | 165/104.24 |
| 2015/0170771 | A1 * | 6/2015 | Ganesan | G21D 5/02 | 376/245 |
| 2016/0027536 | A1 * | 1/2016 | McClure | G21D 5/08 | 376/277 |
| 2017/0125132 | A1 * | 5/2017 | Takeda | G21C 19/04 | |
| 2018/0047471 | A1 * | 2/2018 | Bright | G21F 5/10 | |
| 2019/0096536 | A1 * | 3/2019 | Arafat | F28D 15/06 | |

FOREIGN PATENT DOCUMENTS

| | | | |
|---|---|---|---|
| WO | 2014176069 | A1 | 10/2014 |
| WO | 2021221940 | A1 | 11/2021 |

* cited by examiner

COMPACT PASSIVE DECAY HEAT REMOVAL SYSTEM FOR TRANSPORTABLE MICRO-REACTOR APPLICATIONS

CROSS-REFERENCE TO RELATED APPLICATIONS

This application is a U.S. National Stage Entry under 35 U.S.C. § 371 of International Patent Application No. PCT/US2021/027950, entitled COMPACT PASSIVE DECAY HEAT REMOVAL SYSTEM FOR TRANSPORTABLE MICRO-REACTOR APPLICATIONS, filed Apr. 19, 2021, which claims benefit under 35 U.S.C. § 119 (e) to U.S. Provisional Application Ser. No. 63/018,539 filed May 1, 2020, the entire disclosures of which are hereby incorporated by reference herein.

GOVERNMENT CONTRACT

This invention was made with government support under Contract DE-NE0008853 awarded by the Department of Energy. The government has certain rights in the invention.

BACKGROUND

This invention relates generally to containers used to transfer micro-reactors, and more particularly, to passive thermal heat systems configured to remove heat from the micro-reactors.

The electricity energy market can be divided into centralized and decentralized. The centralized market is based on large (in the range of hundreds of MWe) power generators and high capacity dense transmission and distribution networks. The decentralized or off-grid market relies instead on compact power generators (<15 MWe) usually connected to small localized distribution networks or micro-grids. Currently, remote artic communities, remote mines, military bases and island communities are examples of decentralized markets. At present, the energy in off-grid markets is predominately provided by diesel generators. This leads to high costs of electricity, fossil fuel dependency, load restrictions, complicated fuel supply logistics and aging infrastructure. The stringent requirements of off-grid markets include affordability, reliability, flexibility, resiliency, sustainability (clean energy), energy security, and rapid installation and minimum maintenance efforts. All these demands can be addressed with nuclear energy.

Micro-reactors are nuclear reactors that are capable of generating less than 10 MWe and capable of being deployed for remote application. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. Other examples of micro-reactors are described in commonly owned U.S. Provisional Application Publication No. 62/984,591, titled "HIGH TEMPERATURE HYDRIDE MODERATOR ENABLING COMPACT AND HIGHER POWER DENSITY CORES IN NUCLEAR MICRO-REACTORS", as well as in U.S. patent application Ser. No. 14/773,405, titled "MOBILE HEAT PIPE COOLED FAST REACTOR SYSTEM, which published as U.S. Patent Application Publication No. 2016/0027536, both of which are hereby incorporated by reference in their entireties herein.

Micro-reactors are designed to enable transport using traditional shipping methods, such as CONEX ISO containers. These designs typically utilize ISO 668 shipping containers, illustrated in FIG. 1.

Micro-reactor decay heat needs to be self-regulating and requires passive decay heat removal systems to ensure "walk-away" safety. Decay heat removal systems can have a significant impact on the overall size and weight of micro-reactor transport packaging.

Referring now to FIG. 2, across-sectional view of a micro-reactor 100 positioned within a shipping container 101 is illustrated. The micro-reactor 100 includes a monolith core block 102 that is housed within a reactor canister 104. The monolith core block 102 can include a reactor core 106 that includes a plurality of reactor core blocks 108 and a plurality of reactor shutdown modules 110. The monolith core block 102 can be surrounded by a plurality of control drums 112, each of which include a neutron absorber section 114 and a neutron reflector section 116. The above-described monolith core block 102 and reactor core 106 are described in more detail in commonly owned U.S. Provisional Application Publication No. 62/984,591, which is hereby incorporated by reference in its entirety herein.

The micro-reactor 100 can further include neutron shielding 118 and gamma shielding 120 positioned about the reactor canister 104 of the monolith core block 102. An air gap 122 is defined between the reactor canister 104 and the neutron shielding 118.

Continuing to refer to FIG. 2, a conceptual design of a decay heat removal system is illustrated. Air flow (depicted by segmented arrows) is directed around the periphery of the reactor canister 104 through the air gap 122 through natural convection. This method of decay heat removal system, however, requires a significant geometric footprint. Additionally, the small shipping container 101 requires complex inlets channels, or ducts 124 that direct air flow around the reactor canister 104 and through high chimneys, or outlet ducts 126 to drive sufficient buoyant flow.

Micro-reactor geometric constraints limit space available to install a passive air cooling system utilizing buoyancy driven air flow passages and natural convection, as shown in the conceptual design illustrated in FIG. 2. In addition, the design of an external chimney 126 to promote air flow jeopardizes the safety of the micro-reactor 100 from external threats as it generates a larger target. If damage occurs to the chimneys 126, it could impede the air flow and reduce the effectiveness of cooling. These challenges could put the micro-reactor 100 in a potentially unsafe situation. Operational transients and Design Basis Events require high heat flux, high flow, and large surface areas to remove adequate heat from the micro-reactor, which is not available in the typical configuration shown in FIGS. 1 and 2.

A solution with an increased heat flux capability that will reduce the geometric size of a passive decay heat removal system is needed. A compact passive heat removal system that is resilient to external events will have a large impact in enabling the deployment of micro-reactors.

SUMMARY

In various embodiments, a container for transporting a reactor is disclosed. The container includes a loop thermosiphon including a chamber, a heat exchanger fluidically coupled to the chamber, and an actuator including an unactuated state and an actuated state. The actuator is configured to automatically transition to the actuated state. The transition is based on an event occurring within the reactor. A working medium is configured to remove heat from the reactor in the actuated state.

In various embodiments, a container for transporting a reactor is disclosed. The container includes a closed-loop thermosiphon including an enclosure, a heat exchanger fluidically coupled to the enclosure, and a passive thermal actuator. The enclosure includes a wick and a working medium. The passive thermal actuator is configured to allow the working medium to remove thermal heat from the reactor based on a predetermined action occurring within the reactor.

In various embodiments, a container for transporting a reactor is disclosed. The container includes a loop thermosiphon including an evaporator region including a working medium, a condenser region fluidically coupled to the evaporator region, and a passive thermal actuator. The working medium is configured to absorb thermal heat from the reactor. The working medium configured to passively transport the absorbed thermal heat from the evaporator region to the condenser region. The passive thermal actuator is configured to block the working medium until occurrence of an event within the reactor.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 1:
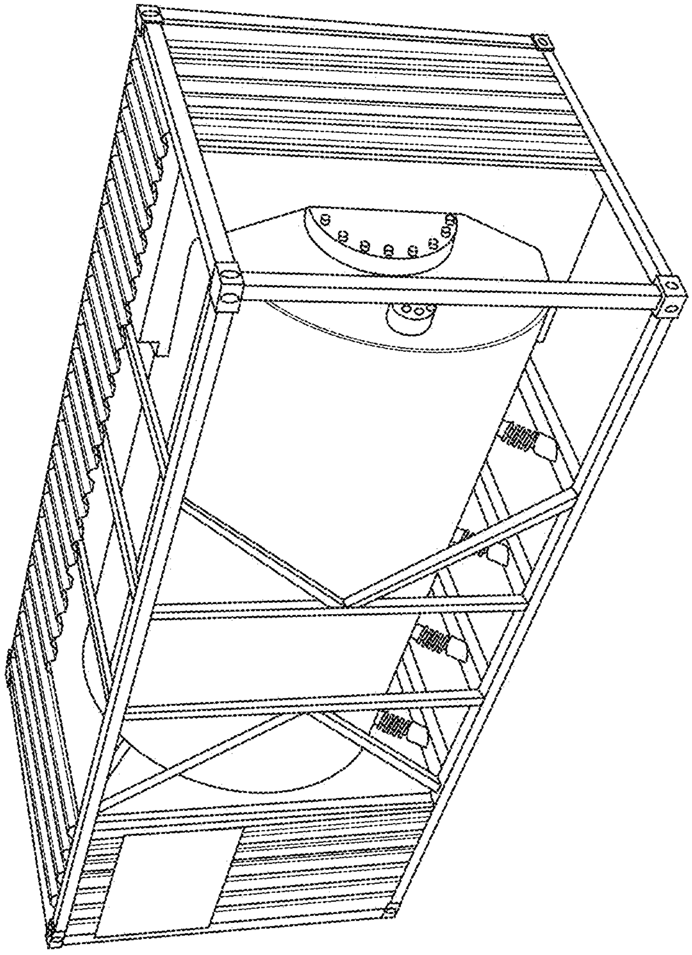
FIG. 1 illustrates a micro-reactor positioned in a shipping container.
Figure 2:
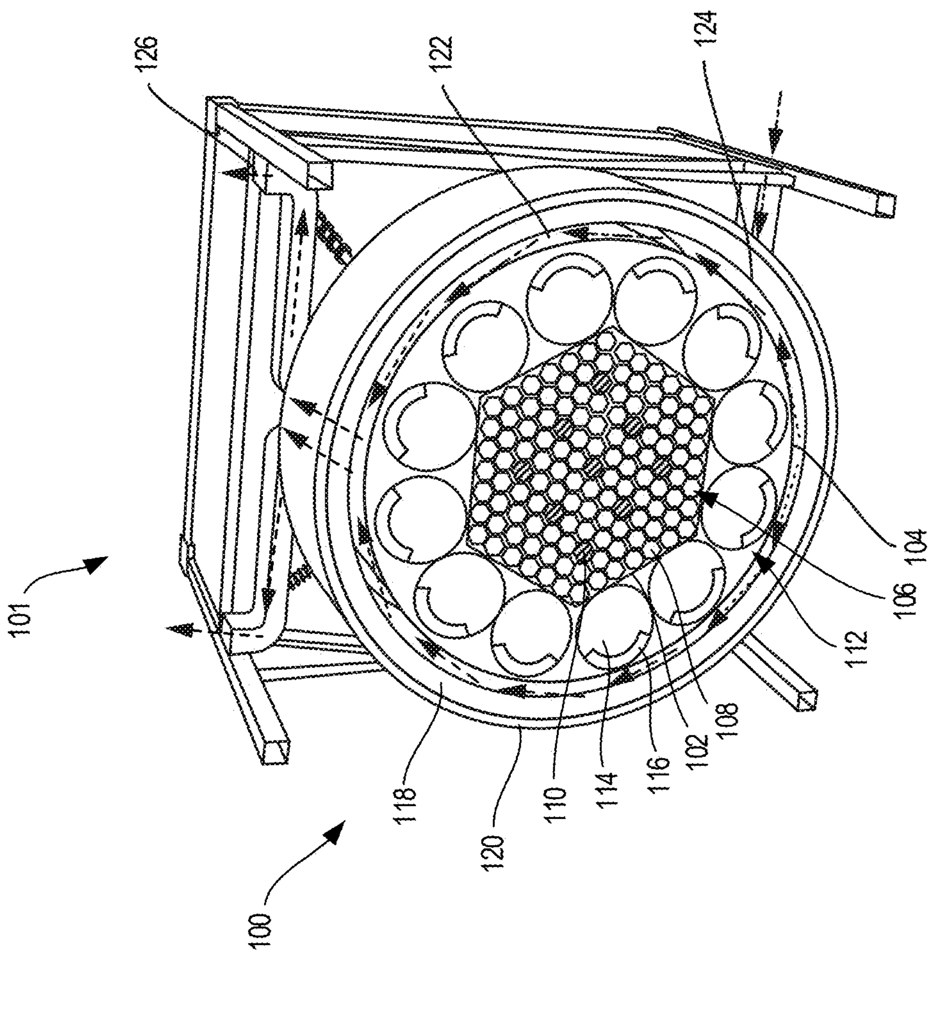
FIG. 2 illustrates a cross-sectional view of a micro-reactor in a shipping container with a conceptual design of a decay heat removal system.
Figure 3:
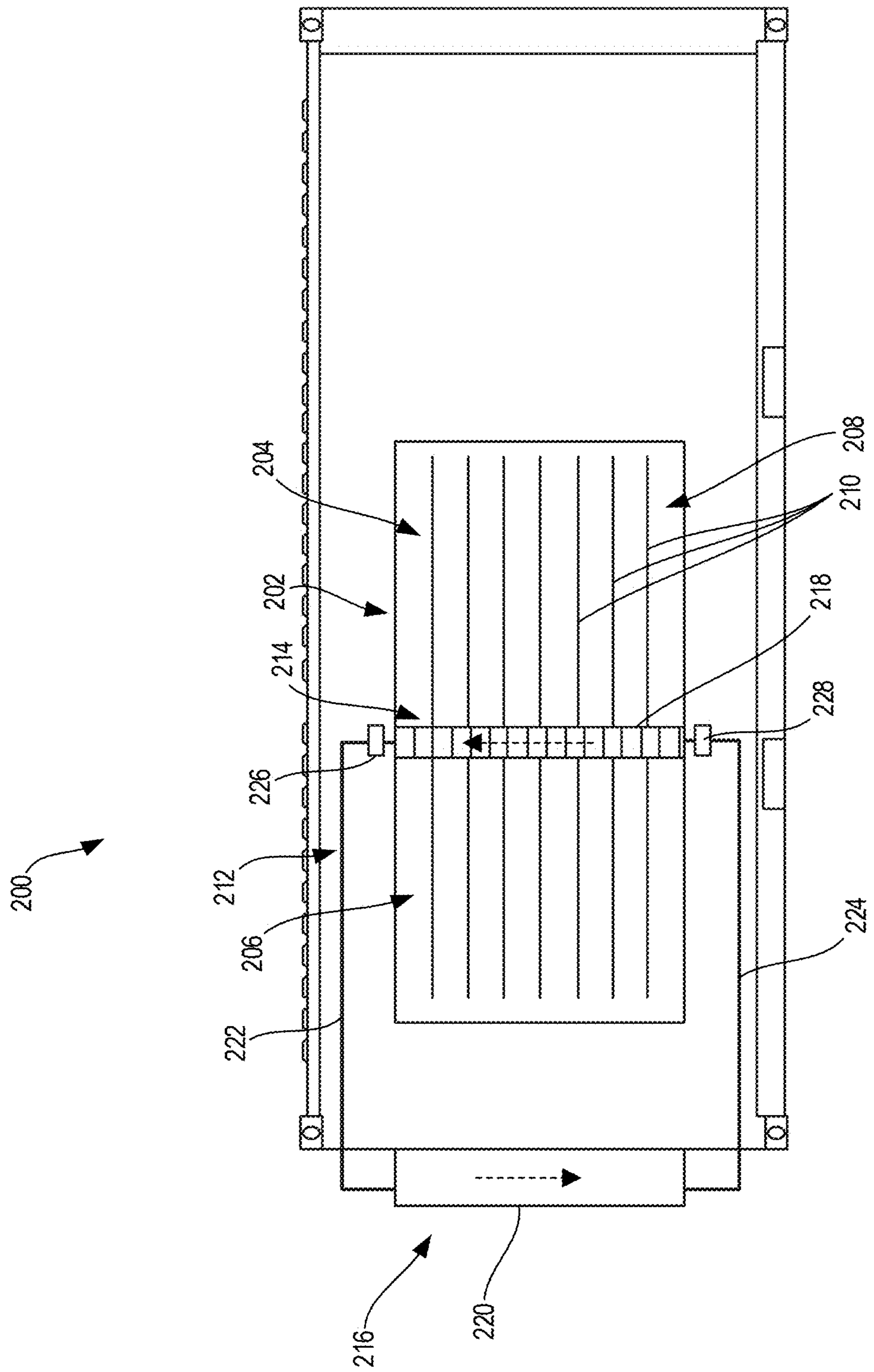
FIG. 3 illustrates a container for transporting a reactor, in accordance with at least one aspect of the present disclosure.

Referring now to FIG. 3, a container 200 for transporting a reactor 202 is illustrated, in accordance with at least one aspect of the present disclosure. The container 200 can include any suitable container that is capable of transporting the reactor 202, such as the CONEX ISO containers, discussed above. The reactor 202 can include a reactor core 204, a primary heat exchanger 206, and a primary coolant system 208. In one embodiment, the primary coolant system 208 can include a plurality of heat pipes 210, which are hermetically sealed, two-phase heat transfer components. In one embodiment, the heat pipes 210 can be used to transfer heat from a primary side of the reactor (evaporator section) to a secondary side of the reactor (condenser section) using a phase change operation of a working fluid (such as water, liquid potassium, sodium, or alkali metal). In operation, the working fluid can absorb heat in the evaporator section and vaporize. The saturated vapor, carrying latent heat of vaporization, flows towards the condenser section and gives off its latent heat and condenses. The condensed liquid is then returned to the evaporator section through a wick by capillary action. In one embodiment, the use of heat pipes eliminates the need for pumping fluid to remove heat from the reactor core 204.

Continuing to refer to FIG. 3, the container 200 can include a loop thermosiphon 212 to transfer decay heat away from the reactor 202 following an event. The event, as an example, can be a loss of secondary cooling. Other events are contemplated by the present disclosure and will be discussed in more detail below. The loop thermosiphon 212 is a closed-loop system that includes an evaporation region 214, a condenser region 216, and a working fluid or medium (illustrated by segmented arrows), such as alkali metal, that can transport decay heat from the evaporation region 214 to the condenser region 216.

The evaporation region 214 of the thermosiphon 212 can include an evaporation chamber or enclosure 218. The evaporation chamber 218 can be in thermal communication with the reactor 202 such that decay heat from the reactor 202 can be transferred to the working medium positioned within the evaporation chamber 218. In one embodiment, the evaporation chamber 218 can be installed over the heat pipes 210. In another embodiment, the evaporation chamber 218 can be in thermal contact with the core block of the reactor 202. In another embodiment, the evaporation chamber 218 can be in thermal contact with the reactor canister. In another embodiment, the evaporation chamber 218 can be connected to any or all sides of the core block or the reactor canister for heat removal. In another embodiment, the evaporation chamber can be divided and connected to multiple locations of the reactor 202. The evaporation chamber 202 provides a diverse heat path for decay heat removal.

Prior to operation, the loop thermosiphon 212 can be evacuated and filled with the working medium, such as an alkali metal, as discussed above. During operation, the working medium can be maintained in a liquid/vapor state by isolating the working medium within a region connected to the primary heat exchanger 206 and/or the reactor core 204. In one embodiment, as discussed above, this can be achieved by selectively positioning the evaporation chamber 218 relative to the heat pipes 218, as an example. In one embodiment, the evaporation chamber 218 can be installed integral to the primary heat exchanger 206.

Continuing to refer to FIG. 3, the condenser region 216 of the loop-thermosiphon 212 can include a heat exchanger 220. The heat exchanger 220 can be fluidically coupled to the evaporation chamber 218 by internal flow paths, such as pipes or tubing 222, 224. After absorbing thermal heat from the reactor 202, the working medium can flow to the heat exchanger 220 of the condenser region 216 via flow path 222. The heat exchanger 216 can be positioned on an external surface of the container 200 such that the absorbed thermal heat within the working medium can be transferred to the air, ground, or body of water, depending on the selected location of the heat exchanger 220. For air cooling, natural convection of air across the exterior of the heat exchanger 220 provides the ultimate heat sink. After releasing the absorbed thermal heat, the working medium can flow back toward the evaporation chamber 218 via flow path 224, allowing the above-described decay heat removal process to repeat.

In one embodiment, the heat exchanger 220 can be installed prior to shipping of the container 200. In another embodiment, the heat exchanger 220 can be integrated into the structure of the container 200. In various embodiments, the heat exchanger 220 can utilize fins (not shown), which can increase the surface area of the heat exchanger 220, increasing the effectiveness of the heat exchangers 220 ability to transfer heat to the surrounding environment. In one embodiment, the finned heat exchanger can have inherent structural capabilities that can be utilized as side panels for the container 200.

Figure 4:
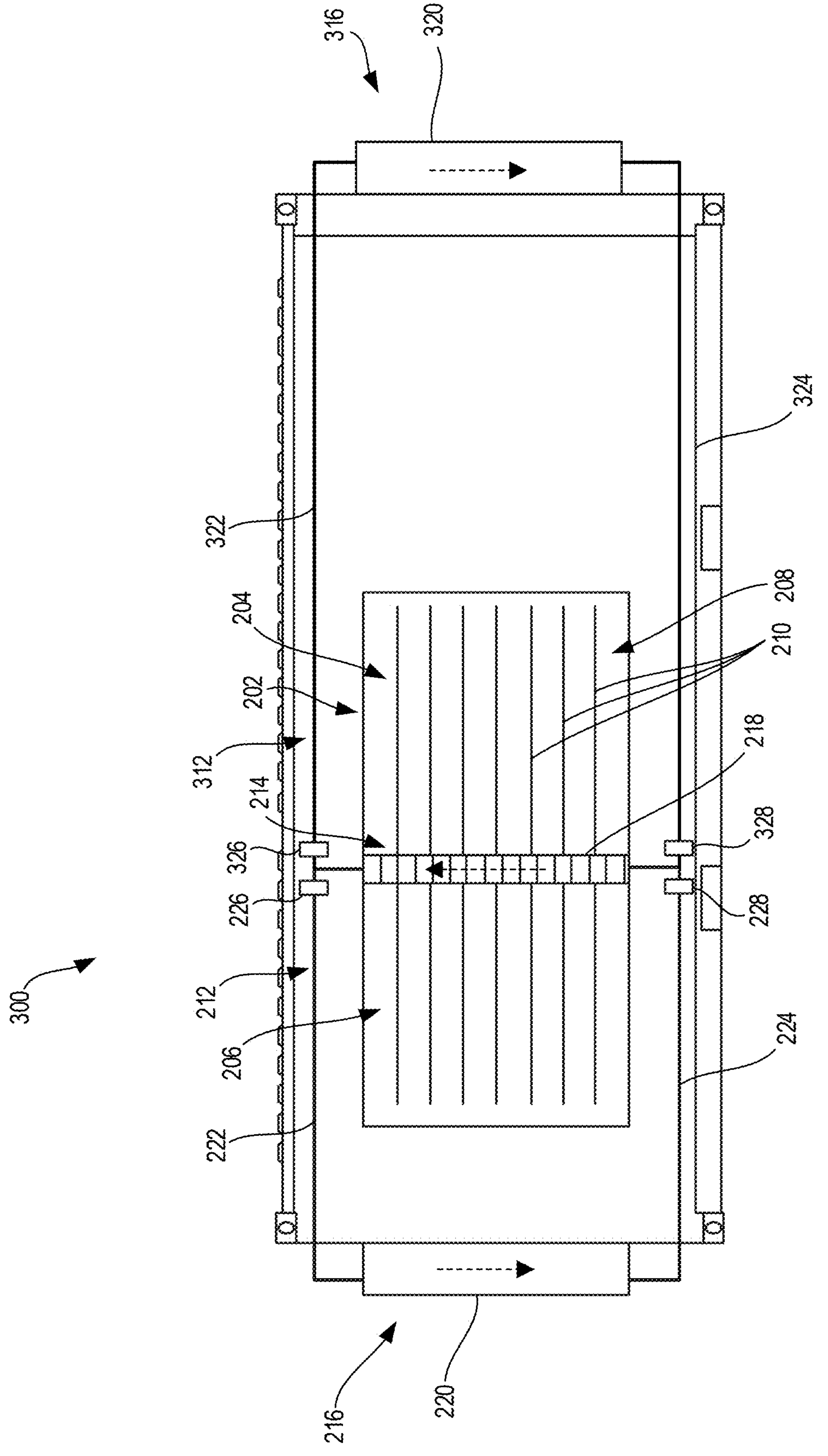
FIG. 4 illustrates another container for transporting a reactor, in accordance with at least one aspect of the present disclosure.

While one heat exchanger 220 is shown and described, the loop thermosiphon 212 can include a plurality of heat exchangers 220 to further increase the loop thermosiphons 212 ability to remove thermal heat from the reactor 202. FIG. 4, as an example, illustrates another container 300 for transporting a reactor 202, in accordance with at least one aspect of the present disclosure. The container 300 can include a loop thermosiphon 312, similar to loop thermosiphon 212 described above, except the flow paths 222, 224 are split to include flow paths 322, 324, which fluidically couple the evaporation chamber 218 to a second condenser region 316 with a second heat exchanger 312. Incorporating a second heat exchanger 320 can increase the loop thermosiphons 312 ability to effectively remove heat from the reactor 202. In one embodiment, the loop thermosiphon 312 can selectively open flow paths 222, 224, 322, 324 such that the working medium selectively transports heat to heat exchangers 220, 320, which will be described in more detail below. Other means of increasing the effectiveness of the heat exchanger 220 are contemplated.

The loop thermosiphon 212 can further include a plurality of actuators 226, 228. As shown in FIG. 3, the loop thermosiphon 212 includes a first actuator 226 positioned on a first end of the evaporation chamber 218 and a second actuator 228 positioned on a second end of the evaporation chamber 218. The actuators 226, 228 are configurable between an unactuated configuration, or state, and an actuated configuration, or state. In the actuated configuration, the actuators 226, 228 can allow the working medium to flow within the loop thermosiphon 212, which permits the working medium to transport thermal heat from the reactor 202 to the heat exchanger 220. In the unactuated configuration, the actuators 226, 228 can maintain the working medium within the evaporation chamber 218. Stated another way, in the unactuated configuration, the actuators 226, 228 can prevent, or block, the working medium from transporting thermal heat from the reactor 202 to the heat exchanger 220.

The actuators 226, 228 can be passive actuators that dynamically, or automatically, transition between the unactuated and actuated configurations based on a predefined event, or events, occurring within the reactor 202, such as a loss of secondary cooling, as mentioned above. Once the predefined event is met, reached, or exceeded, the actuators 226, 228 can automatically transition to the actuated configuration to allow the working medium to remove heat from the reactor 202. Once a sufficient amount of heat has been removed from the reactor 202 to bring the reactor 202 to a normal operating state, or another predefined event occurs, the actuators 226, 228 can automatically transition to the unactuated configuration, preventing, or blocking, the working medium from further removing heat from the reactor 202. The ability of the actuators 226, 228 to passively, dynamically transition between the unactuated and actuated configurations allows the loop thermosiphon 212 to remove heat from the reactor 202 without human intervention and on an ‘as needed’ basis.

In various other embodiments, the actuators 226, 228 can be externally controlled to transition between the unactuated and actuated configurations. In one example embodiment, the actuators 226, 228 can transition between the unactuated and actuated configurations based on an event external to the reactor 202, such as a user providing a manual input that can transition the actuators 226, 228 between the unactuated and actuated configurations. In one embodiment, sensors can detect various parameters within the reactor, such as temperature, pressure, neutron flux, amount of hydrogen, as examples. Tc user can monitor these parameters and control the actuators 226, 228 to transition between the unactuated and actuated configurations to control the amount of heat removed from the reactor 202.

Referring again to FIG. 4, as discussed above, the loop thermosiphon 312 can include more than one heat exchanger, such as two heat exchangers 220, 320. Similar to above, the loop thermosiphon 312 can include a plurality of actuators 226, 228 that can dynamically, or automatically, transition between unactuated and actuated configurations to allow the working medium to transfer heat to heat exchanger 220. In addition, the loop thermosiphon 312 can include another plurality of actuators 326, 328 that can dynamically, or automatically, transition between unactuated and actuated configurations to allow the working medium to transfer heat to heat exchanger 320. The actuators 226, 228, 326, 328 can selectively transition between the unactuated and actuated configurations to allow the working medium to selectively transfer heat to heat exchangers 220, 320. In one such embodiment, actuators 226, 228 can transition to the actuated position when a first event occurs, such as a first threshold temperature is reached, and actuators 326, 328 can transition to the actuated position when a second event occurs, such as a second, larger threshold temperature is reached.

In one embodiment, the actuators 226, 228, 326, 328 can comprise thermal actuators, such as the thermal actuator assembly described in U.S. Pat. No. 10,047,730, which is hereby incorporated by reference in its entirety herein. These thermal actuators, or other similar thermal actuators, can be designed to transition between the unactuated and actuated configurations based on a temperature at a single point within the reactor 202. In another embodiment, the thermal actuators can transition between the unactuated and actuated configurations based on temperatures at a plurality of points within the reactor 202.

In one embodiment, the thermal actuators can transition to the actuated configuration based on the temperature within the reactor 202 reaching, or exceeding, a threshold temperature and transition to the unactuated position based on the temperature within the reactor 202 reaching, or dropping below, a threshold temperature. In one embodiment, the threshold temperature can correspond to a transient or accident event level temperature threshold. In another embodiment, the actuators 226, 228, 326, 328 can comprise melting plugs. The melting plugs can comprise a material that is compatible with the working medium and other materials within the loop thermosiphons 212, 312 with which the melting plug may come into contact. During operation, a temperature increase to, or above, the melting temperature of the actuators 226, 228, 326, 328 causes the actuators 226, 228, 326, 328 to transition from an unactuated configuration an actuated configuration.

Other types of actuators that can effectively open the flow path within the loop thermosiphons 212, 312 based on a temperature threshold are contemplated by the present disclosure. In one embodiment, the actuators 226, 228, 326, 328 can generate motion to open the flow path based on thermal expansion amplification. This type of actuator could be tuned to an increased temperature that indicates a reduction of normal cooling.

Other types of actuators that can effectively open the flow path within the loop thermosiphons 212, 312 based on parameters other than temperature are contemplated by the present disclosure. In one embodiment, the actuators 226, 228, 326, 328 can comprise valves that can be coupled with encapsulated dihydride moderator located within the reactor 202. When hydrogen is released from the moderator, pressure within the reactor 202 will increase. When the pressure within the reactor 202 reaches or exceeds a pressure threshold, the valves can transition to the actuated configuration to initiate the passive cooling of the reactor 202. In one embodiment, the amount of passive cooling the valves can allow within the loop thermosiphon 212 can be based on an amount of pressure detected within the reactor 202. As an example, the amount of passive cooling can be a function of an amount of pressure detected within the reactor 202 above the pressure threshold. When the pressure within the reactor 202 reaches, or drops below, a pressure threshold, the valves can transition to the unactuated configuration, preventing further passive cooling.

In another embodiment, the actuators 226, 228, 326, 328 can be coupled to a neutron detector. The neutron detector can compare a detected amount of neutron flux against a neutron flux threshold. When the detected neutron flux reaches or exceeds the neutron flux threshold, the neutron detector can transmit an electrical signal to the actuators 226, 228, 326, 328, which can initiate the passive heat removal from the reactor 202 via the loop thermosiphons 212, 312. In one embodiment, the amount of passive cooling the actuators 226, 228, 326, 328 can allow within the loop thermosiphons 212, 312 can be based on an amount of neutron flux detected within the reactor 202. As an example, the amount of passive cooling can be a function of an amount of neutron flux detected within the reactor 202 above the neutron flux threshold. When the neutron flux within the reactor 202 reaches, or drops below, the neutron flux threshold, the actuators 226, 228, 326, 328 can transition to the unactuated configuration, preventing further passive cooling.

While the actuators 226, 228, 326, 328 described hereinabove were described as transitioning between the actuated configuration and the unactuated configuration based on a single event, or action, occurring within the reactor 202, such as exceeding a pressure threshold, a temperature threshold, or a neutron flux threshold, as examples, the actuators 226, 228, 326, 328 can monitor a plurality of events within the reactor 202. As a result, the actuators 226, 228, 326, 328 can transition between the actuated configuration and the unactuated configuration based on a combination of a plurality of events, or actions, within the reactor.

Employing appropriate actuators 226, 228, 326, 328 can effectively increase the passive heat removal from the reactor 202 when needed and reduce the passive heat removal from the reactor 202 when not needed. This will reduce/eliminate the amount of parasitic, waste heat to the environment that is not needed during normal operations.

Referring to FIG. 3, upon actuation of the passive thermal actuators 226, 228, the working medium can flow upwards within the evaporation chamber 218 and towards the heat exchanger 220 via the flow path 222. The working medium will begin to condense and transfer heat to the internal flow paths within the heat exchanger 220. As discussed above, the heat can be transferred to the air, ground, or body of water depending on the location of the heat exchanger 220. The condensed working medium can then flow and return to the evaporation chamber 218, via the flow path 224, where it can be reheated by the thermal heat within the reactor 202 and repeat the above described process, so long as the passive thermal actuators 226, 228 remain in the actuated position. The above-described process is substantially similar for loop thermosiphon 312.

Depending on the thermal mass and initial conditions of the system, the working medium may solidify within the heat exchangers 220, 320. Depending on final component sizing, the latent heat of condensation may be sufficient to heat the system above the working medium solidification point. If this cannot be accomplished, in one embodiment, a small preheater (not shown) can be installed within the heat exchangers 220, 320 to always maintain the temperature above the working medium solidification temperature. This temperature is much lower than the reactor operating temperature and can be easily achieved. The small preheater would not be required to provide heat following an accident scenario.

Depending on the cooling demand of the reactor 202, the loop thermosiphons 212, 312 thermal performance, which is driven by natural convection, can be increased by installing wicks in the form of tubes or more complex vapor chamber geometry, within the evaporator chamber 218. In one embodiment, the wick can include a mesh wick. In one embodiment, the wick can include an extruded wick. In one embodiment, the wick can include a hydroformed wick, which are described in U.S. patent application Ser. No. 16/853,270, titled "INTERNAL HYDROFORMING METHOD FOR MANUFACTURING HEAT PIPE WICKS" and U.S. Provisional Patent Application No. 63/012,725, titled "INTERNAL HYDROFORMING METHOD FOR MANUFACTURING HEAT PIPE WICKS UTILIZING A HOLLOW MANDREL AND SHEATH", which are hereby incorporated by reference in there entireties herein. In one embodiment, the wick can include any suitable shape, such as a star, a circle or a square, as examples. In another embodiment, wicks can be installed within the flow paths 222, 224, 322, 324 fluidically coupling the evaporator chamber 218 and the heat exchangers 220, 320. In another embodiment, wicks can be installed within the heat exchangers 220, 320. In one embodiment, the wick can include rifling on inside surfaces of various components of the loop thermosiphons, such are the evaporator chamber 218, the flow paths 222, 224, 322, 324, or the heat exchangers 220, 320, as examples. These enhancements can enhance heat transfer capabilities of the loop thermosiphons 212, 312 by adding capillary pumping to the flow circuit.

The dynamic response of a self-regulating reactor due to transients or accidents are dependent on the passive heat removal of the loop thermosiphons 212, 312. Additional heat capacity can be incorporated into the loop thermosiphons 212, 312 by adjusting the working medium reservoir to the required heat capacity required for transients and design basis accidents. Heat capacity can also be added by allowing material to melt around, or in, the heat exchangers 220, 320.

The heat removal rate can be tuned by adjusting a size of the heat exchanger. In addition, the heat removal rate can be tuned by selectively allowing only certain sections of the heat exchanger to remove heat. The selective sections can actuate at specific reactor parameters to ensure heat removal rate corresponds to the heat removal rate required by the transient or accident.

The above-described invention reduces the reliance of highly restrictive internal air flow paths as the natural convection cooling path of the reactor. Utilizing a finned heat exchanger, as an example, drastically increases the heat removal capability with the loop thermosiphon, enabling this capability. The above-described invention enables a reduced overall geometric size requirement for the passive heat removal system. This enables micro-reactor technology by utilizing a finned heat exchanger and combines it with the structural function of the ISO container panels. The above-described invention allows the heat exchanger to be installed to the container or near the container. This enables the ultimate heat sink to utilize air, soil, or a body of water depending on the availability. The thermal efficiency of the above-described loop thermosiphon, sizing of the finned heat exchangers, and utilization of the heat capacity in the working medium can be designed to match the dynamic heat response required for transients and accidents. In addition, the above-described invention has not moving parts, which substantially reduces the chance of failure compared to cooling systems that use active components, such as fans or pumps.

Various aspects of the subject matter described herein are set out in the following examples.

Example 1—A container for transporting a reactor, the container comprising a loop thermosiphon comprising a chamber, a heat exchanger fluidically coupled to the chamber, and an actuator comprising an unactuated state and an actuated state. The actuator is configured to automatically transition to the actuated state. The transition is based on an event occurring within the reactor. A working medium is configured to remove heat from the reactor in the actuated state.

Example 2—The container of Example 1, wherein the reactor comprises a plurality of heat pipes, and wherein the chamber is positioned over the heat pipes.

Example 3—The container of Example 1, wherein the reactor comprises a core block, and wherein the chamber is in thermal contact with the core block.

Example 4—The container of any one of Examples 1-3, wherein the event comprises the reactor reaching or exceeding a threshold temperature.

Example 5—The container of any one of Examples 1-4, wherein the event comprises an increase in pressure within the reactor.

Example 6—The container of any one of Examples 1-5, wherein the event comprises an increase in neutron flux within the reactor.

Example 7—The container of any one of Examples 1-6, wherein the chamber comprises a wick.

Example 8—A container for transporting a reactor, the container comprising a closed-loop thermosiphon comprising an enclosure, a heat exchanger fluidically coupled to the enclosure, and a passive thermal actuator. The enclosure comprises a wick and a working medium. The passive thermal actuator is configured to allow the working medium to remove thermal heat from the reactor based on a predetermined action occurring within the reactor.

Example 9—The container of Example 8, wherein the reactor comprises a plurality of heat pipes, and wherein the enclosure is positioned over the heat pipes.

Example 10—The container of Example 8, wherein the reactor comprises a core block, and wherein the enclosure is in thermal contact with the core block.

Example 11—The container of any one of Examples 8-10, wherein the predetermined action comprises the reactor reaching or exceeding a threshold temperature.

Example 12—The container of any one of Examples 8-11, wherein the predetermined action comprises an increase in pressure within the reactor.

Example 13—The container of any one of Examples 8-12, wherein the predetermined action comprises an increase in neutron flux within the reactor.

Example 14—A container for transporting a reactor, the container comprising a loop thermosiphon comprising an evaporator region comprising a working medium, a condenser region fluidically coupled to the evaporator region, and a passive thermal actuator. The working medium is configured to absorb thermal heat from the reactor. The working medium configured to passively transport the absorbed thermal heat from the evaporator region to the condenser region. The passive thermal actuator is configured to block the working medium until occurrence of an event within the reactor.

Example 15—The container of Example 14, wherein the event comprises the reactor reaching or exceeding a threshold temperature.

Example 16—The container of Example 15, wherein the threshold temperature corresponds to an accident temperature threshold.

Example 17—The container of any one of Examples 14-16, wherein the event comprises an increase in pressure within the reactor.

Example 18—The container of any one of Examples 14-17, wherein the event comprises an increase in neutron flux within the reactor.

Example 19—The container of any one of Examples 14-18, wherein the reactor comprises a plurality of heat pipes, and wherein the evaporator region is positioned over the heat pipes.

Example 20—The container of any one of Examples 14-18, wherein the reactor comprises a core block, and wherein the evaporator region is in thermal contact with the core block.

Unless specifically stated otherwise as apparent from the foregoing disclosure, it is appreciated that, throughout the foregoing disclosure, discussions using terms such as "processing," "computing," "calculating," "determining," "displaying." or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A. B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A container configured for transporting a reactor, the container comprising:
 a loop thermosiphon, comprising:
  a chamber in direct thermal contact with the reactor based on the reactor being positioned in the container;
  a working medium;
  a heat exchanger fluidically coupled to the chamber; and
  an actuator configurable in a plurality of states, the plurality of states comprising:
   an unactuated state, wherein the actuator maintains the working medium within the chamber in the unactuated state; and
   an actuated state, wherein the actuator is configured to transition from the unactuated state to the actuated state based on an event;
  wherein the working medium is configured to remove heat from the reactor based on the reactor being positioned in the container, and wherein the working medium is configured to flow from the chamber to the heat exchanger based on the actuator transitioning from the unactuated state to the actuated state.

2. The container of claim 1, wherein the reactor comprises a plurality of heat pipes, and wherein the chamber is positioned in direct thermal contact with the heat pipes based on the reactor being positioned in the container.

3. The container of claim 1, wherein the reactor comprises a core block, and wherein the chamber is in direct thermal contact with the core block based on the reactor being positioned in the container.

4. The container of claim 1, wherein the event comprises the reactor reaching or exceeding a threshold temperature based on the reactor being positioned in the container.

5. The container of claim 1, wherein the event comprises an increase in pressure within the reactor based on the reactor being positioned in the container.

6. The container of claim 1, wherein the event comprises an increase in neutron flux within the reactor based on the reactor being positioned in the container.

7. The container of claim 1, wherein the event comprises a manual user input.

8. The container of claim 1, wherein the heat exchanger is mounted to an external surface of the container.

9. A container configured for transporting a reactor, the container comprising:
 a closed-loop thermosiphon, comprising:
  an enclosure in direct thermal contact with the reactor based on the reactor being positioned in the container;
  a working medium;
  a heat exchanger in fluid communication with the enclosure, the heat exchanger configured to remove thermal heat from the working medium; and
  a passive actuator, wherein the passive actuator prevents the working medium from flowing from the enclosure to the heat exchanger until a predefined event occurs, and wherein the predefined event is to actuate the passive actuator to permit the working medium to flow from the enclosure to the heat exchanger to remove the thermal heat from the reactor based on the reactor being positioned in the container.

10. The container of claim 9, wherein the reactor comprises a plurality of heat pipes, and wherein the enclosure is positioned in direct thermal contact with the heat pipes based on the reactor being positioned in the container.

11. The container of claim 9, wherein the reactor comprises a core block, and wherein the enclosure is in direct thermal contact with the core block based on the reactor being positioned in the container.

12. The container of claim 9, wherein the predefined event comprises the reactor reaching or exceeding a threshold temperature based on the reactor being positioned in the container.

13. The container of claim 9, wherein the predefined event comprises an increase in pressure within the reactor based on the reactor being positioned in the container.

14. The container of claim 9, wherein the predefined event comprises an increase in neutron flux within the reactor based on the reactor being positioned in the container.

15. The container of claim 9, wherein the heat exchanger is mounted to an external surface of the container.

16. A container configured for transporting a reactor, the container comprising:
 a loop thermosiphon, comprising:
  an evaporator region comprising a working medium, the evaporator region being in direct thermal contact with the reactor based on the reactor being positioned in the container, wherein the working medium is configured to absorb thermal heat from the reactor based on the reactor being positioned in the container;
  a condenser region fluidically coupled to the evaporator region, the condenser region including a heat exchanger, wherein the working medium is configured to transport the absorbed thermal heat from the evaporator region to the condenser region; and
  a passive actuator configured to prevent the working medium from flowing from the evaporator region to the condenser region until occurrence of an event, wherein the passive actuator is configured to be actuated to permit the working medium to flow from the evaporator region to the heat exchanger based on the occurrence of the event, and wherein the heat exchanger is configured to remove the absorbed thermal heat from the working medium.

17. The container of claim 16, wherein the event comprises the reactor reaching or exceeding a threshold temperature based on the reactor being positioned in the container.

18. The container of claim 17, wherein the threshold temperature corresponds to an accident temperature threshold.

19. The container of claim 16, wherein the event comprises an increase in pressure within the reactor based on the reactor being positioned in the container.

20. The container of claim 16, wherein the event comprises an increase in neutron flux within the reactor based on the reactor being positioned in the container.

21. The container of claim 16, wherein the reactor comprises a plurality of heat pipes, and wherein the evaporator region is positioned in direct thermal contact with the heat pipes based on the reactor being positioned in the container.

22. The container of claim 16, wherein the reactor comprises a core block, and wherein the evaporator region is in direct thermal contact with the core block based on the reactor being positioned in the container.

23. The container of claim 16, wherein the heat exchanger is mounted to an external surface of the container.

* * * * *